(12) United States Patent
Pavlik

(10) Patent No.: US 6,807,633 B1
(45) Date of Patent: Oct. 19, 2004

(54) DIGITAL SIGNATURE SYSTEM

(75) Inventor: Patrick Pavlik, Waterloo (CA)

(73) Assignee: Xign, Inc., Pleasanton, CA (US)

( * ) Notice: Subject to any disclaimer, the term of this patent is extended or adjusted under 35 U.S.C. 154(b) by 0 days.

(21) Appl. No.: 09/577,660

(22) Filed: May 25, 2000

(30) Foreign Application Priority Data

May 25, 1999 (CA) .............................................. 2272723

(51) Int. Cl.⁷ ............................. H04L 9/00; H04L 9/32
(52) U.S. Cl. ....................... 713/170; 713/176; 713/180; 713/155
(58) Field of Search ............................... 713/155, 176, 713/180, 170; 380/227

(56) References Cited

U.S. PATENT DOCUMENTS

| | | | |
|---|---|---|---|
| 4,385,285 A | 5/1983 | Horst et al. ..................... | 382/3 |
| 5,121,945 A | 6/1992 | Thomson et al. .............. | 283/58 |
| 5,283,829 A | 2/1994 | Anderson ..................... | 380/24 |
| 5,383,113 A | 1/1995 | Kight et al. ................. | 364/401 |
| 5,465,206 A | 11/1995 | Hilt et al. .................... | 364/406 |
| 5,487,100 A | 1/1996 | Kane ............................ | 379/57 |
| 5,504,677 A | 4/1996 | Pollin .......................... | 364/408 |
| 5,532,464 A | 7/1996 | Josephson et al. ........... | 235/379 |
| 5,570,465 A | 10/1996 | Tsakanikas ................... | 395/114 |
| 5,677,955 A | 10/1997 | Doggett et al. .............. | 380/24 |
| 5,689,593 A | 11/1997 | Pan et al. ..................... | 385/11 |
| 5,717,868 A | 2/1998 | James ......................... | 395/325 |
| 5,727,249 A | 3/1998 | Pollin ........................... | 705/40 |
| 5,848,400 A | 12/1998 | Chang .......................... | 705/35 |
| 5,884,288 A | 3/1999 | Chang et al. .................. | 705/40 |
| 5,893,080 A | 4/1999 | McGurl et al. ................ | 705/40 |
| 6,021,202 A | 2/2000 | Anderson et al. ............ | 380/25 |
| 6,223,168 B1 | 4/2001 | McGurl et al. ............... | 705/40 |
| 6,233,341 B1 * | 5/2001 | Riggins ....................... | 380/277 |

FOREIGN PATENT DOCUMENTS

| | | | |
|---|---|---|---|
| EP | 0 665 486 A2 | 2/1995 | ............. G06F/1/00 |
| WO | WO 00/18060 | 3/2000 | ............. H04L/9/00 |

OTHER PUBLICATIONS

King et al., U.S. patent application publication No. 20020152133 A1, "Marketplaces for on–line contract negotiation, formation, and price and availability querying," published Oct. 17, 2002.

"E–Billing: New Age Electronic Data", Jul. 5, 2000, Bank Technology News.

K. Hill, "The Direction of the Industry Part II: Assessing the leaders in the industry," ebillmag.com, editorial, Jul. 2001.

(List continued on next page.)

Primary Examiner—Gilberto Barron
Assistant Examiner—Grigory Gurshman
(74) Attorney, Agent, or Firm—Wilson Sonsini Goodrich & Rosati

(57) ABSTRACT

A digital signature system includes a data receiver for receiving an electronic document over a network; an encryption key database, and a signature processor in communication with the encryption key database and the data receiver. The encryption key database includes encryption key records, each being associated with a subscriber of the database and identifying an encryption key uniquely associated with the subscriber. The signature processor is configured for receiving an indicator of one of the subscribers and for deriving a digital signature from the received electronic data and the encryption key associated with the one subscriber. Upon receipt of electronic data and an indicator of one of the database subscribers, the digital signature system derives a digital signature from the received electronic data and the encryption key associated with the one database subscriber. Typically, the database subscriber is the originator of the electronic data, and the data originator identifies itself by providing the signature processor with a personal identification number assigned to the data originator. After the digital signature is derived, preferably the digital signature system then transmits the derived digital signature to the data originator.

10 Claims, 3 Drawing Sheets

OTHER PUBLICATIONS

K. Hill, "The Direction of the Industry Part I: What you need to lead," ebillmag.com, editorial, Jun. 2001.

J. Patel, "Business–to–business E–Billing Heats up", InformationWeek, 246, Oct. 23, 2000.

J. Patel et al., "E–Billing Moves Into B2B," Imaging & document solutions, v10, n1, p44(5), Jan. 2001.

B. Malone, "Internet Billing: Building a Secure Global Market," Electronic Commerce World, v11, n1, p46, Jan. 2001.

S. Leibs, "Internet Billing Gets Its Due," CFO, v17, n2, p30, Feb. 2001.

G. Platt, "Online Billing & Payments: Technology Providers Multiply," Global Finance, v15, n4, p40, Apr. 2001.

"Business–to–Business EIPP: Presentment Models and Payment Options Part One: Presentment Models," Jan. 2001, Council for Electronic Billing and Payment.

"Business–to–Business EIPP: Presentment Models and Payment Options Part Two: Payment Options," Jan. 2001, Council for Electronic Billing and Payment.

J. Akister et al., "Electronic Cheque Processing System," U.S. patent application No. 09/633,861, filed Aug. 7, 2000.

* cited by examiner

DIGITAL SIGNATURE SYSTEM

FIELD OF THE INVENTION

The present invention relates to a system for maintaining security of electronic documents. In particular, the present invention relates to a method and system for securely incorporating digital signatures into electronic documents.

BACKGROUND OF THE INVENTION

The Internet has provided network users with a mechanism for reducing communication costs by distributing maintenance costs of the network amongst a number of different network servers. This requirement has provided the Internet with a distinctly "open" character, with the result that electronic documents transmitted over the Internet can be intercepted by parties other than the intended recipients, altered by the intercepting parties, and then transmitted to the original intended recipients without the recipients having knowledge of the alteration. This weakness can be particularly problematic, particularly for parties engaged in e-commerce transactions over the Internet, since the terms of an order can be altered by a third party without authorization from the ordering party. Alternately, credit card numbers, bank account numbers or other financial information necessary for completion of e-commerce transactions can be intercepted and used by unscrupulous parties to generate unauthorized orders for goods or services.

To address this problem, the concept of a digital signature was developed as a means for allowing recipients of electronic documents to verify the authenticity of the electronic document. To use a digital signature, an originator of an electronic document first obtains from a trusted source a private encryption key uniquely associated with the document originator. The private encryption key is also uniquely associated with a publicly available encryption key which allows recipients of electronic documents encrypted with the associated private encryption key to decrypt the encrypted document using the associated public encryption key. Since the private encryption key is provided only to the document originator, recipients of the encrypted document can use the public encryption key to verify that the encrypted document originated from the document originator. The trusted source maintains a database of publicly available digital certificates, each of which identify the name of the holder of a private encryption key, and the public encryption key associated with the private encryption key.

After the document originator is assigned a private encryption key, the document originator applies a hash algorithm to the electronic document. Preferably, the hash algorithm returns a data word which is uniquely associated with the electronic document, but does not allow the electronic document to be recreated from the data word. The document originator then encrypts the hashed data word with the assigned private encryption key, thereby producing a digital signature which is uniquely associated with the electronic document and the document originator. The digital signature is appended to the electronic document, and is transmitted to the intended recipient together with a copy of the originator's digital certificate. Typically, each digital certificate also includes the digital signature of the trusted source.

Upon receipt of the electronic document, the recipient verifies the authenticity of the document by first decrypting the digital signature attached to the digital certificate using the public encryption key supplied by the trusted source. The recipient then applies the hash algorithm to the digital certificate, and then compares the data word returned from the hash algorithm with the data word extracted from the digital signature of the digital certificate. If the hash values match, the recipient has verification that the digital certificate is authentic, and that the public encryption key included with the digital certificate was assigned by the trusted source. After the digital certificate is authenticated, the document recipient decrypts the digital signature attached to the electronic document using the public encryption key included with the digital certificate, applies the hash algorithm to the electronic document, and then compares the data word returned from the hash algorithm with the hashed data word extracted from the digital signature of the electronic document. If the hash values match, then the document recipient has verification that the electronic document originated from the named originator, and was not altered during transmission by third parties.

Although digital signatures have significantly enhanced the ability of document recipients to verify the authenticity of an electronic document, the mechanism by which digital signatures are employed has remained cumbersome. For instance, if the document originator wishes to transmit a digitally signed e-mail message, the originator must obtain and install e-mail software capable of generating a hash value and using a private encryption key for encrypting the hash value. Further, typically the originator must have access to an Internet browser capable of establishing a secure communications path with the encryption key provider for providing the e-mail software with the private encryption key. Although digital encryption compliant e-mail software packages and secure Internet browsers are now available for use on Windows-based operating systems, digital encryption compliant e-mail software packages are not available for all operating systems. Also, the transmission of digitally signed electronic documents from portable wireless devices is often hindered by the computing power and memory resource limitations of such devices.

Digital signatures have also gained popularity for use with electronic cheques as a mechanism to avoid repudiation For instance, the Financial Services Technology Consortium (U.S. Pat. No. 5,677,955) has developed an electronic finds transfer instrument (electronic cheque) as a venue for electronic bill payment. The electronic cheque is generated on a computer-based system which includes a hardware peripheral device for receiving a PCMCIA card. The PCMCIA card is used by cheque issuer's bank, and securely stores the user's private encryption key, and a personal identification number to prevent unauthorized access to the encryption key. The PCMCIA card also includes a register for identifying cheques signed and issued, a mechanism to calculate the hash value of the electronic cheques, and a mechanism to calculate digital signatures from the hash values using the private encryption key. The computer-based system interfaces with the PCMCIA card, and is configured to endorse the electronic cheque with the digital signature received from the PCMCIA card, and to electronically transmit the endorsed electronic cheque to the recipient. Although the computer-based system provides a mechanism for securely generating and transmitting electronic cheques, rapid deployment of the system is limited by the need for a PCMCIA interface device and by the requirement that the issuing bank encode the user's PCMCIA card with the user's private encryption key.

Therefore, there remains a need for a mechanism which facilitates the use of digital signatures across a variety of computing platforms, and without the necessity of hardware peripheral devices.

SUMMARY OF THE INVENTION

According to the present invention, there is provided a digital signature system and a method of providing digital signatures for electronic documents which addresses deficiencies of the prior art.

The digital signature system, according to a first aspect of the present invention, includes a data receiver for receiving an electronic document over a network; an encryption key database, and a signature processor in communication with the encryption key database and the data receiver. The encryption key database includes encryption key records, each being associated with a subscriber of the database and identifying an encryption key uniquely associated with the subscriber. The signature processor is configured for receiving an indicator of one of the subscribers and for deriving a digital signature from the received electronic data and the encryption key associated with the one subscriber.

The method of providing digital signatures, according to the first aspect of the present invention, includes the steps of (1) providing an encryption key database including encryption key records, each record being associated with a subscriber of the database and identifying an encryption key uniquely associated with the subscriber; (2) receiving electronic data over a network; (3) receiving an indicator of one of the database subscribers; and (4) deriving a digital signature from the received electronic data and the encryption key associated with the one database subscriber.

The digital signature system, according to a second aspect of the present invention, includes a data receiver, an encryption key database, a data processor in communication with the encryption key database and the data receiver, and a data transmitter in communication with the data processor. The data receiver is configured for receiving over a network electronic data from one of a number of network users. The encryption key database includes encryption key records, each being associated with a respective one of the network users and identifying an encryption key uniquely associated with the one network user. The data processor is configured for deriving a digital signature from the received electronic data and the encryption key associated with the one network user. The signature transmitter is configured for providing the one network user with the derived digital signature.

The method of providing digital signatures, according to the second aspect of the present invention, includes the steps of (1) providing an encryption key database including encryption key records, each record being associated with a subscriber of the database and identifying an encryption key uniquely associated with the subscriber; (2) receiving over a network electronic data from one of the database subscribers; (3) deriving a digital signature from the received electronic data and the encryption key associated with the one database subscriber; and (4) transmitting the derived digital signature to the one database subscriber.

In accordance with a preferred implementation of the invention, the one database subscriber is also the originator of the electronic data, and the data originator identifies itself by providing the signature processor with an personal identification number assigned to the data originator. Upon receipt of the personal identification number, the signature processor derives the digital signature with the encryption key assigned to the data originator. After the digital signature is derived, the digital signature system transmits the derived digital signature to the data originator. In one variation, the signature processor includes a document database including template records, each template record including at least one document data item. The data receiver is configured to receive from the one database subscriber an indicator of a selected one of the template records, and the signature processor is configured for assembling an electronic document from the received electronic data and the at least one document data items of the selected one template record, and for deriving the digital signature from the assembled electronic document. The data transmitter is configured to transmit the assembled electronic document together with the derived digital signature to the one database subscriber.

BRIEF DESCRIPTION OF THE DRAWINGS

The preferred embodiment of the invention will now be described, by way of example only, with reference to the drawings, in which.

DETAILED DESCRIPTION OF THE PREFERRED EMBODIMENT

Figure 1:
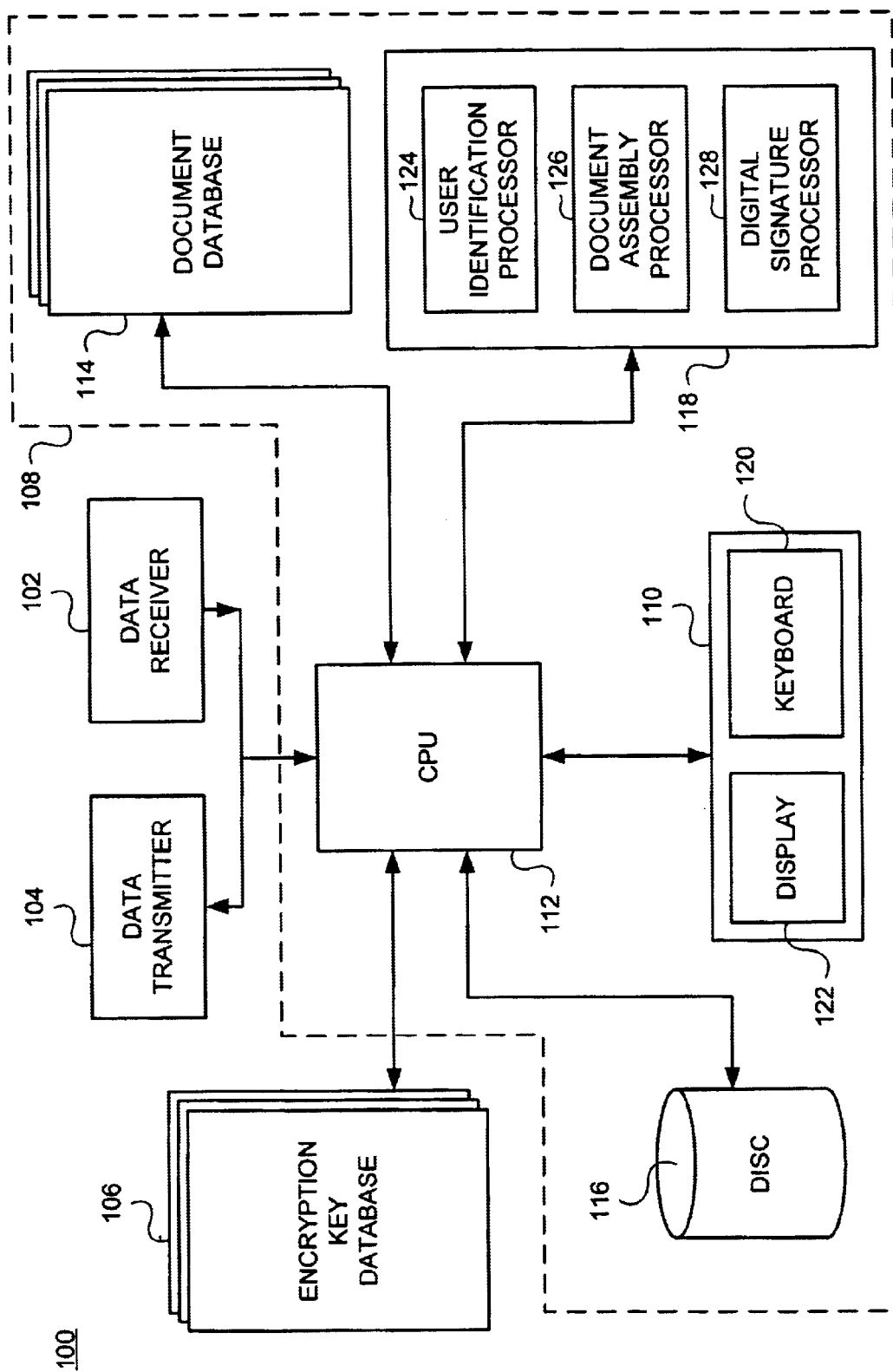
FIG. 1 is a schematic diagram of a digital signature system, according to the present invention, showing the data receiver, the encryption key database, the signature data processor, and the data transmitter.

Turning to FIG. 1, a digital signature system, denoted generally as 100, is shown comprising a data receiver 102, a data transmitter 104, an encryption key database 106, and a data processor 108. Typically, the digital signature system 100 comprises a server computer, and is accessible over a land-based wide area network, such as the Internet, to provide digital signatures to land-based client computers. However, the digital signature system 100 may also be accessible over a local area network, or a wireless network to provide digital signatures to wireless-based client computers, such as portable data assistants, wireless pagers and wireless telephones.

The data receiver 102 interfaces the digital signature system 100 with the network, and is configured to receive electronic data over the network from users of the network. The data transmitter 104 also interfaces the digital signature system 100 with the network, but is configured to transmit electronic data to the network users over the network. However, it should be understood that it is not imperative that the digital signature system 100 transmits electronic data over the same network which it receives electronic data. For instance, the digital signature system 100 may be configured to receive electronic data over a wireless network and to transmit electronic data over a land-based network. Further, the digital signature system 100 may be configured to transmit electronic data to a network user different from the network user from which it receives electronic data. Other network configurations will be apparent to those of ordinary skill.

Preferably, the encryption key database 106 is stored in a non-volatile storage medium, such as a magnetic hard drive or optical drive, and includes a plurality of encryption key records. Each encryption key record includes a user identification code associated with a respective one of the network users, a private encryption key uniquely associated with the user identification code, and a public encryption key uniquely associated with the private encryption key. The private encryption keys are not provided to members of the public, and are used by the digital signature system 100 to derive the digital signature for each electronic document The public encryption keys are provided to members of the public, and are used by members of the public to decrypt each digital signature so as to provide verification of the integrity of each electronic document received from a network user.

The data processor 108 is in communication with the data receiver 102, the data transmitter 104, and the encryption key database 106, and is configured for deriving a digital signature from the electronic data received by the data receiver 102. The data processor 108 comprises a user interface 110, a central processing unit (CPU) 112 in communication with the user interface 110, a document database 114 in communication with the CPU 112, and a non-volatile memory (DISC) 116 and a read/write memory (RAM) 118 both in communication with the CPU 110. The user interface 110 comprises a data entry device 120, such as a keyboard, for entering data into the encryption key database 106 and the document database 114, and a display device 122, such as a CRT or LCD, for viewing the contents of the encryption key database 106 and the document database 114.

The DISC 116 includes processor instructions for the CPU 112. The processor instructions establish in the RAM 118 a memory object defining a user identification processor 124, a memory object defining a document assembly processor 126, and a memory object defining a digital signature processor 128. However, the user identification processor 124, the document assembly processor 126, and the digital signature processor 128 need not be implemented as memory objects, but instead may be implemented in electronic hardware, if desired.

Figure 2:
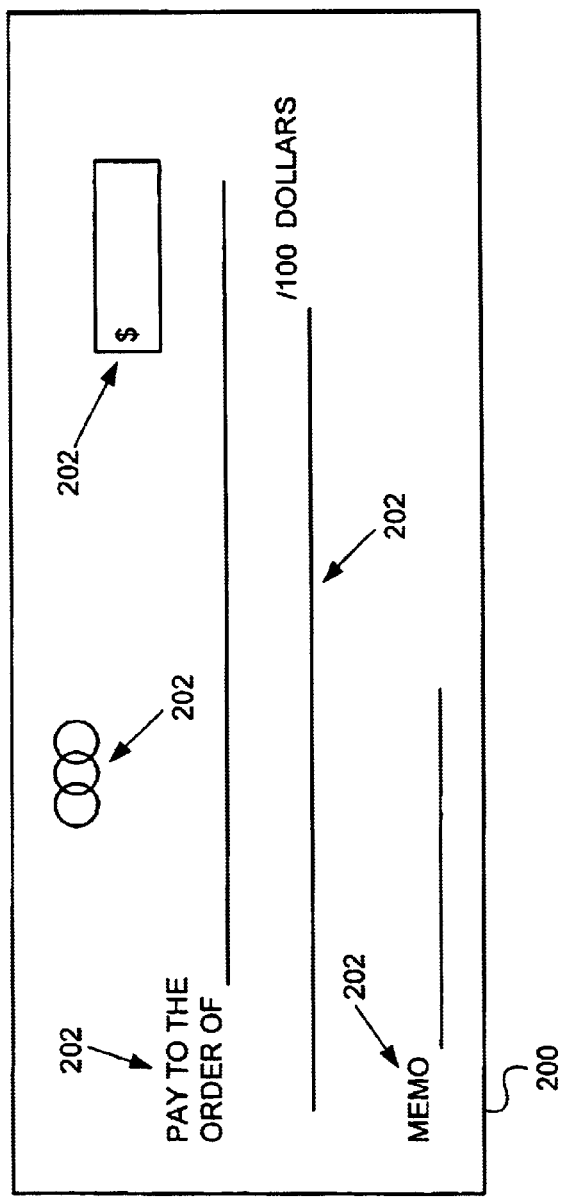
FIG. 2 is a schematic view of a sample electronic document template suitable for use with the digital signature system shown in FIG. 1.

Preferably, the document database 114 is stored in a non-volatile storage medium, such as a magnetic hard drive, optical drive, EEPROM or flash memory, and includes a plurality of template records. Further, preferably each template record includes a document identification code, and at least one document data item, with the document data items of each template record together defining an electronic document template. Alternately, each template record may include, either in addition to or in replacement of the document identification code, a user identification code identifying a network user authorized to access the electronic document template. A sample electronic document template 200, configured as an electronic cheque, is shown in FIG. 2 including a plurality of document data items 202. As shown in FIG. 2, the document data items 202 may comprise text data and/or graphical data. Preferably, each document data item 202 includes positional code, implemented in Standard Graphic Markup Language (SGML), Extensible Markup Language (XML), Financial Services Markup Language (FSML), or other suitable markup language, to define the relative orientation of the document data items 202 within the electronic document template 200.

Figure 3:
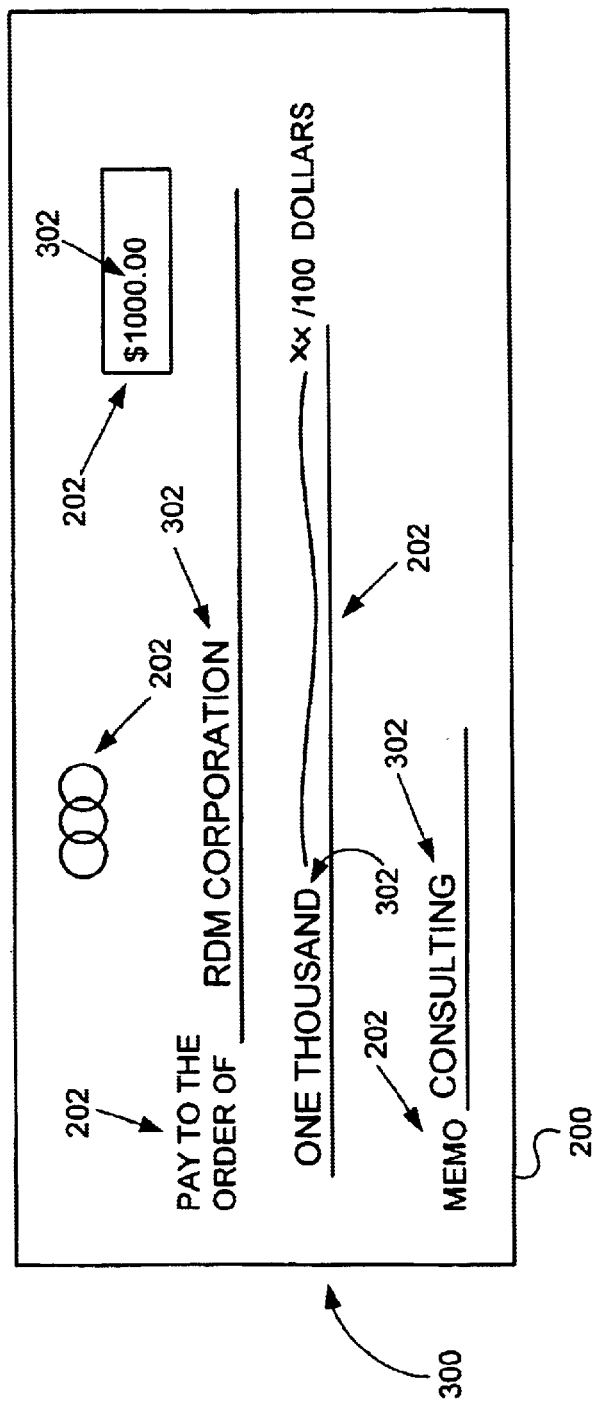
FIG. 3 is a schematic view of a sample electronic document produced by the digital signature system.

The user identification processor 124 is configured to receive personal identification numbers (PINs) from the network users, via the data receiver 102, and to query the user identification codes stored in the encryption key database 106 with each received PIN and thereby extract from the encryption key database 106 the private encryption key associated with each received PIN. The document assembly processor 126 is configured to receive document identification numbers from the network users, via the data receiver 102, and to query the document identification codes stored in the document database 114 with each received document identification number and thereby extract from the document database 114 the electronic document template 200 associated with each received document identification number. If the template records of the document database 114 include a user identification code, preferably the document assembly processor 126 is also configured to receive personal identification numbers (PINs) from the network users and to query the user identification codes of the template records so as to extract the required electronic document template 200. The document assembly processor 126 is also configured to assemble an electronic document from the retrieved electronic document template 200 by receiving electronic data records from the network users, via the data receiver 102, for insertion into the retrieved electronic document template 200. A sample assembled electronic document 300, configured as an electronic cheque, is shown in FIG. 3 including a plurality of electronic data records 302 and a plurality of the document data items 202.

The digital signature processor 128 is configured to derive a digital signature from the assembled electronic document 300 and the encryption key associated with the provided user identification code. The document assembly processor 126 is configured to append the derived digital signature to the assembled electronic document 300, and to transmit the electronic document 300 (appended with the digital signature) to the data transmitter 104 for transmission over the network to the intended network user. Typically, the data transmitter 104 is configured to transmit the electronic document 300 and digital signature to the network user which initiated communication with the digital signature system 100. However, in one variation, the data processor 108 is configured to receive (via the data receiver 102) the target network address, such as an e-mail address, of the desired recipient of the electronic document 300 and digital signature, and the data transmitter 104 is configured to transmit the electronic document 300 and digital signature to the specified target network address. Further, in another variation, the data transmitter 104 is configured to only transmit the derived digital signature to the specified target network address.

In operation, a network user desiring to transmit an electronic document 300 with a digital signature first registers itself with the digital signature system 100. Preferably, the network user registers itself with the digital signature system 100 by attending personally at an establishment operating thee digital signature system 100, and provides the system operator of the digital signature system 100 with one or more items of identification, such as a photographic drivers license or passport. Alternately, the network user may access a network server (associated with the digital signature system 100) over the network using a secure communications link, established for example by a Secure Sockets Layer (SSL) or Secure Hypertext Transfer Protocol (SHTTP), so as to provide the digital signature system 100 with electronic documentation, such as credit card information and/or bank account information, to establish the identity of the network user. Once the system operator is satisfied as to the validity of the identification information provided, the system operator enters the identification information into the digital signature system 100 via the user interface 110. The system operator then provides the network user with a personal identification number (PIN) to subsequently identify itself to the digital signature system 100, creates a unique private encryption key for the network user and a public encryption key uniquely associated with the private encryption key, and then inserts an encryption key record in the encryption key database 106 which specifies the PIN and the encryption keys assigned to the network user. Preferably, the system operator then provides the network user with a digital certificate which includes the network user's public encryption key.

Preferably, the network user also provides the system operator of the digital signature system 100 with am electronic document template 200 which the network user requests the digital signature system 100 use to assemble all electronic document 300. As discussed above, preferably the document data items 202 of the electronic document template 200 include positional code to define the relative orientation of each document data item 202 within the electronic document template 200. The network user then assigns a document identification code to the electronic document template 200, and inserts a template record into the document database 114 which includes the user identification code assigned to the network user, the document identification code assigned to the electronic document template 200, and the document data items 202 of the electronic document template 200.

After the registration process is complete, the system operator provides the network user with a network address from which the network user downloads a client software module to allow the network user to access the digital signature system 100 over the network. Preferably, the client software module is configured to establish a secure communications path (for example via SSL or SHTTP) with the digital signature system 100 so as to allow the network user to provide the digital signature system 100 with network user's PIN, the document identification number of the desired electronic document template 200, and the electronic data records for inclusion with the desired electronic document template 200.

After the client software module is installed on the network user's computing platform, the network user invokes the client software module and establishes a secure communications link with the digital signature system 100. After the secure communications link is established, the network user uses a suitable interface provided in the client software module to transmit to the digital signature system 100 electronic data records which the network users requires to be incorporated with the network user's electronic template 200 into the electronic document 300. The electronic data records are received by the document assembly processor 126 over the secure communications link, via the data receiver 102. In response, the user identification processor 124 transmits an electronic message, via the data transmitter 104, to the network user's client software module requesting the network. User enter the assigned PIN. The network user then enters the assigned PIN via a suitable interface provided in the client software module, and then transmits the assigned PIN to the digital signature system 100 over the secure communications link The PIN data is received by the data receiver 102 of the digital signature system 100.

Upon receipt of the PIN data from the network user, the user identification processor 124 queries the user identification codes stored in the encryption key database 106 with the PIN data. If an encryption key record is found in the encryption key database 106 having a user identification code corresponding to the PIN data received from the network user, the user identification processor 124 extracts from the encryption key database 106 the private encryption key associated with the PIN data. After the encryption key is extracted, if the document database 114 includes document identification codes, the document assembly processor 126 transmits an electronic message, via the data transmitter 104, to the network user's client software module requesting the network user enter a document identification number identifying the requested electronic document template 200. The network user then enters the document identification number via a suitable interface provided in the client software module, and then transmits the document identification number to the digital signature system 100 over the secure communications link. The document identification number is received by the data receiver 102 of the digital signature system 100.

Upon receipt of the document identification number, the document assembly processor 126 queries the document identification codes stored in the document database 114 with the received document identification number. If a template record is found in the document database 114 having a document identification code corresponding to the received document identification number, the document assembly processor 126 extracts from the document database 114 the electronic document template 200 associated with the document identification number. Alternately, if the document database 114 includes both document identification codes and user identification codes, the document assembly processor 126 only extracts the electronic document template 200 from the document database 114 if the user identification code of template record having the electronic document template 200 corresponds to the network user's PIN. On the other hand, if the document database 114 includes only user identification codes, the document assembly processor 126 does not transmit a message to the network user requesting submission of a a document identification number, but instead queries the user identification codes stored in the document database 114 with the network user's PIN, and then extracts from the document database 114 the electronic template 200 associated with the user's PIN.

After the specified electronic document template 200 is extracted from the document database 114, the document assembly processor 126 assembles the desired electronic document 300 from the electronic document template 200 and from the electronic data records received from the network user. It should be understood, however, that the step of predefining an electronic document template 200 with the electronic signature system 100 is not essential to the invention. For instance, in one variation, the network user transmits to the digital signature system 100 a completed electronic document 300 instead of electronic data records 302 or document identification numbers. It will be appreciated that in this variation, the electronic data transmitted to the digital signature system 100 immediately after the secure communications link is established include both document data items 202 and electronic data records 302 for inclusion with the document data items 202 into the electronic document 300.

After the electronic document 300 is established, the digital signature processor 122 derives a hash code for the electronic document 300, and then derives the digital signature for the electronic document 300 by encrypting the hash code with the private encryption key extracted from the encryption key database 106. Preferably the digital signature also includes a time stamp identifying the time and date that the digital signature was created. Preferably, the digital signature processor 122 then transmits the derived digital signature to the data transmitter 104 for transmission back to the network user over the secure communications link. The network user then appends the received digital signature to the electronic document 300, and transmits the digitally signed electronic document to the intended recipient, together with a copy of the network user's digital certificate.

Alternately, in one variation, the document assembly processor 126 appends the digital signature to the data transmitter 104, and includes therewith the network user's digital certificate identifying the public encryption key associated with the extracted private encryption key. The document assembly processor 126 then transmits the electronic document 300, digital signature and digital certificate to the data transmitter 104 for transmission back to the network user over the secure communications link. However, it should be understood that the data transmitter 104 need not transmit the digital signature (and electronic document 300) to the same network user which originated communication with the digital signature system 100. Accordingly, in one variation, upon receipt of the data necessary to derive the digital signature, the data receiver 102 relinquishes the secure connection with the network user, and the data transmitter 104 transmits the digital signature (and electronic document 300 and digital certificate) to a network address specified by the original network user. In this variation, the specified network address can include an e-mail address.

The present invention is defined by the claims appended hereto, with the foregoing description being merely illustrative of the preferred embodiment of the invention. Those of ordinary skill may envisage certain additions, deletions and/or modifications to the described embodiment, which although not explicitly described herein, do not depart from the spirit or scope of the invention, as defined by the appended claims.

I claim:

1. A digital signature system comprising:

a data receiver for receiving electronic data over a network;

an encryption key database including encryption key records, each said record being associated with a subscriber of the database and identifying an encryption key uniquely associated with the subscriber; and a signature processor in communication with the encryption key database and the data receiver, the signature processor being configured for receiving an indicator of one of the subscribers and for deriving a digital signature from the received electronic data and the encryption key associated with the one subscriber;

wherein each said record includes an identification code uniquely associated with the respective encryption key, the subscriber indicator comprises a subscriber identification number, and the signature processor is configured for deriving the digital signature in accordance with the received identification number and a corresponding one of the identification codes;

wherein the signature processor includes a document database including template records, each said template record including at least one document data item, the data receiver is configured for receiving an indicator of a selected one of the template records, and the signature processor is configured for deriving the digital signature from the received electronic data and the at least one document data items of the selected one template record.

2. The digital signature system according to claim 1, wherein the document receiver is configured for establishing a secure communications link with the one database subscriber, and for receiving the electronic data over the secure communications link.

3. A method of providing digital signatures for electronic documents, comprising the steps of:

providing an encryption key database including encryption key records, each said record being associated with a subscriber of the database and identifying an encryption key uniquely associated with the subscriber;

receiving electronic data over a network;

receiving an indicator of one of the database subscribers; and deriving a digital signature from the received electronic data and the encryption key associated with the one database subscriber;

wherein each said record includes an identification code uniquely associated with the respective encryption key, the subscriber indicator comprises a subscriber identification number, and the deriving step comprises the steps of querying the encryption database with the received subscriber identification number for a corresponding one of the identification codes, extracting from the encryption database the encryption key associated with the corresponding one identification code, and deriving the digital signature in accordance with the extracted encryption key;

wherein the electronic data receiving step comprises the steps of receiving an indicator of a desired document template, receiving at least one data element for incorporation into an electronic document, and assembling the electronic document from the desired document template and the at least one data element, and the deriving step comprises deriving the digital signature from the assembled electronic document.

4. The method according to claim 3, wherein the electronic data receiving step comprises the steps of establishing a secure communications link with the one database subscriber, and receiving the electronic data over the secure communications link.

5. A digital signature system comprising:

a data receiver for receiving over a network electronic data from one of a plurality of network users;

an encryption key database including encryption key records, each said record being associated with a respective one of the network users and identifying an encryption key uniquely associated with the one network user;

a data processor in communication with the encryption key database and the data receiver, the data processor being configured for deriving a digital signature from the received electronic data and the encryption key associated with the one network user; and a data transmitter in communication with the data processor for providing the one network user with the derived digital signature;

wherein each said record includes an identification code uniquely associated with the respective encryption key, and the data processor is configured for receiving a subscriber identification number from the one network user and for deriving the digital signature in accordance with the received identification number and a corresponding one of the identification codes;

wherein the data processor includes a document database including template records, each said template record including at least one document data item, the data receiver is configured for receiving from the one network user an indicator of a selected one of the template records, and the data processor is configured for deriving the digital signature from the received electronic data and the at least one document data items of the selected one template record.

6. The digital signature system according to claim 5, wherein the received electronic data and the at least one document data items of the selected one template record together comprise an electronic document, the data processor is configured for assembling the electronic document from the received electronic data and the at least one document data items of the selected one template record, and the data transmitter is configured for transmitting the assembled electronic document together with the derived digital signature to the one network user.

7. The digital signature system according to claim 6, wherein the data receiver is configured for establishing a secure communications link with the one network user and for receiving the electronic data over the secure communications link, and the data transmitter is configured for transmitting the assembled electronic document together with the derived digital signature over the secure communications link.

8. A method of providing digital signatures for electronic documents, comprising the steps of:

provided an encryption key database including encryption key records, each said record being associated with a subscriber of the database and identifying an encryption key uniquely associated with the subscriber;

receiving over a network electronic data from one of the database subscribers;

deriving a digital signature from the received electronic data and the encryption key associated with the one database subscriber; and transmitting the derived digital signature to the one database subscriber;

wherein each said record includes an identification code uniquely associated with the respective encryption key, and the deriving step comprises the steps of receiving over the network a subscriber identification number from the one database subscriber, querying the encryption database with the received subscriber identification number for a corresponding one of the identification codes, extracting from the encryption database the encryption key associated with the corresponding one identification code, and deriving the digital signature in accordance with the extracted encryption key;

wherein the electronic data receiving step comprises the steps of receiving an indicator of a desired document template, receiving at least one data element for incorporation into an electronic document, and assembling the electronic document from the desired document template and the at least one data element, and the deriving step comprises deriving the digital signature from the assembled electronic document.

9. The method according to claim 8, wherein transmitting step comprises transmitting the assembled electronic document together with the derived digital signature to the one database subscriber.

10. The method according to claim 9, wherein the electronic data receiving step comprises the steps of establishing a secure communications link with the one database subscriber and receiving the electronic data over the secure communications link, and the transmitting step comprises transmitting the derived digital signature together with the derived digital signature over the secure communications link.

* * * * *